(12) United States Patent
Tsung et al.

(10) Patent No.: US 10,137,429 B2
(45) Date of Patent: Nov. 27, 2018

(54) MOLECULAR ENCAPSULATION IN METAL-ORGANIC FRAMEWORK CRYSTALS

(71) Applicant: THE TRUSTEES OF BOSTON COLLEGE, Chestnut Hill, MA (US)

(72) Inventors: Chia-Kuang Tsung, Allston, MA (US); Jeffery Byers, Newton, MA (US)

(73) Assignee: THE TRUSTEES OF BOSTON COLLEGE, Chestnut Hill, MA (US)

(*) Notice: Subject to any disclaimer, the term of this patent is extended or adjusted under 35 U.S.C. 154(b) by 0 days.

(21) Appl. No.: 15/502,551

(22) PCT Filed: Aug. 17, 2015

(86) PCT No.: PCT/US2015/045555
§ 371 (c)(1),
(2) Date: Feb. 8, 2017

(87) PCT Pub. No.: WO2016/028702
PCT Pub. Date: Feb. 25, 2016

(65) Prior Publication Data
US 2017/0232420 A1    Aug. 17, 2017

Related U.S. Application Data

(60) Provisional application No. 62/038,414, filed on Aug. 18, 2014.

(51) Int. Cl.
| | |
|---|---|
| *B01J 20/22* | (2006.01) |
| *C01B 39/00* | (2006.01) |
| *B01J 31/16* | (2006.01) |
| *B01J 31/24* | (2006.01) |
| *C09B 11/24* | (2006.01) |
| *C09K 11/02* | (2006.01) |
| *C09K 11/06* | (2006.01) |

(52) U.S. Cl.
CPC ......... *B01J 20/226* (2013.01); *B01J 31/1691* (2013.01); *B01J 31/2404* (2013.01); *C01B 39/00* (2013.01); *C09B 11/24* (2013.01); *C09K 11/025* (2013.01); *C09K 11/06* (2013.01); *C09K 2211/1007* (2013.01); *C09K 2211/1088* (2013.01)

(58) Field of Classification Search
CPC .. B01J 20/226; B01J 31/1691; B01J 31/2404; C09B 11/24; C09K 11/025; C09K 11/06
USPC .......................................................... 556/1
See application file for complete search history.

(56) References Cited

U.S. PATENT DOCUMENTS

| | | | | |
|---|---|---|---|---|
| 7,923,396 B2* | 4/2011 | Boehmer | ............. | B01J 29/7415 502/60 |
| 2010/0186588 A1* | 7/2010 | Yaghi | ................. | B01D 17/0202 95/127 |
| 2012/0259117 A1* | 10/2012 | Yaghi | .................... | C07F 15/006 546/8 |
| 2013/0023403 A1* | 1/2013 | Larsen | .................. | C07F 13/005 502/164 |
| 2013/0096210 A1 | 4/2013 | Yaghi et al. | | |

OTHER PUBLICATIONS

Chen et al., J Materials Chem. A, 2014, 1-42. (Year: 2014).*
Alkordi, M. et al., "Zeolite-like Metal-Organic Frameworks as Platforms for Applications: On Metalloporphyrin-Based Catalysts," Journal of the American Chemical Society 130, 2008, pp. 12639-12641. Three pages.
Calzaferri, G.et al., "Host-Guest Antenna Materials," Angewandte Chemie International Edition 42, 2003, pp. 3732-3758. Twenty-seven pages.
Cardin, D., "Encapsulated Conducting Polymers," Advanced Materials 14, No. 8, 2002, pp. 553-563. Eleven pages.
Corma, A. et al., "Supramolecular Host-Guest Systems in Zeolites Prepared by Ship-in-a-Bottle Synthesis," European Journal of Inorganic Chemistry, 2004, pp. 1143-1164. Twenty-two pages.
Costa, J. et al., "Chemical Modification of a Bridging Ligand Inside a Metal-Organic Framework while Maintaining the 3D Structure," European Journal of Inorganic Chemistry, 2008, pp. 1551-1554. Four pages.
Dutta, P. et al., "Photoelectron Transfer in Zeolite Cages and its Relevance to Solar Energy Conversion," Journal of Physical Chemistry Letters 2, 2011, pp. 467-476. Ten pages.
Horcajada, P. et al., "Porous metal-organic-framework nanoscale carriers as a potential platform for drug delivery and imaging," Nature Materials 9, 2010, pp. 172-178. Seven pages.
International Preliminary Report on Patentability, dated Mar. 2, 2017, from International Application No. PCT/US2015/045555, filed on Aug. 17, 2015. Eight pages.
Kuo, C. et al., "Yok-Shell Nanocrystal@ZIP-8 Nanostructures for Gas-Phase Heterogeneous Catalysis with Selectivity Control," Journal of the American Chemical Society, vol. 134., 2012, pp. 14345-14348 and Supporting Information. Twelve pages.
Larsen, R. et al., "Photoinduced inter-cavity electron transfer between Ru(II)tris(2,2'-bipyridne) and Co(II)tris(2,2'-bipyridine) Co-encapsulated within a Zn(II)-trimesic acid metal organic framework," Journal of Materials Chemistry A 1, 2013, pp. 14133-14139. Seven pages.

(Continued)

*Primary Examiner* — Clinton A Brooks
*Assistant Examiner* — Kofi Adzamli
(74) *Attorney, Agent, or Firm* — HoustonHogle LLP; Doreen Hogle (57) ABSTRACT

The present invention provides novel host-guest complexes, wherein the guest molecule has a diameter larger than the aperture size of the host-a metal organic framework (MOF). The novel host-guest complexes of the invention can be used for drug delivery, sensing, electrical conductivity, luminescence, and energy conversion. The invention also provides a method of making the novel host-guest complex, utilizing the linker exchange conditions in which a guest molecule having a diameter larger than the aperture size of the host is encapsulated into the MOF.

19 Claims, 9 Drawing Sheets

(56) References Cited

OTHER PUBLICATIONS

Lee, J.Y. et al., "Metal-organic framework materials as catalysts," Chemical Society Reviews 38, 2009, pp. 1450-1459. Eleven pages.

Li, B. et al., "Metal-Cation-Directed de Novo Assembly of a Functionalized Guest Molecule in the Nanospace of a Metal-Organic Framework," Journal of the American Chemical Society 136, 2014, pp. 1202-1205. Four pages.

McGilvray, K. et al., "A simple and smart oxygen sensor based on the intrazeolite reactions of a substituted anthraquinone," Chemical Communications, 2006, pp. 4401-4403. Three pages.

Martinez-Martinez, V. et al., "Charge Transfer and Exciplex Emissions from a Naphthalenediimide-Entangled Coordination Framework Accommodating Various Aromatic Guests," Journal of Physical Chemistry C 116, 2012, pp. 26084-26090. Seven pages.

Mueller, M. et al., "Highly emissive metal-organic framework composites by host-guest chemistry," Photochemical & Photobiological Sciences 9, 2010, pp. 846-853. Eight pages.

Rimoli, M. et al., "Synthetic zeolites as a new tool for drug delivery," Journal of Biomedical Materials Research 87A, 2008, pp. 156-164. Nine pages.

Rocca, J.D. et al., "Nanoscale Metal-Organic Frameworks for Biomedical Imaging and Drug Delivery," Accounts of Chemical Research, vol. 44, No. 10, Oct. 2011, pp. 957-968. Twenty-five pages.

Son, H-J. et al., "Light-Harvesting and Ultrafast Energy Migration in Porphyrin-Based Metal-Organic Frameworks," Journal of the American Chemical Society 135, 2013, pp. 862-869. Eight pages.

Talin, A. et al., "Tunable Electrical Conductivity in Metal-Organic Framework Thin-Film Devices," Science 343, 2014, pp. 66-69. Five pages.

Wang, J-L. et al., "Metal-Organic Frameworks for Light Harvesting and Photocatalysis," ACS Catalysis 2, 2012, pp. 2630-2640. Eleven pages.

Yanai, N. et al., "Gas detection by structural variations of fluorescent guest molecules in a flexible porous coordination polymer," Nature Materials 10, 2011, p. 787-793. Seven pages.

International Search Report and Written Opinion of the International Searching Authority, dated Nov. 19, 2015, from International Application No. PCT/US2015/45555, filed Aug. 17, 2015. Eight pages.

Kuo, C-H. et al., "Yolk-Shell Nanocrystal@ZIF-8 Nanostructures for Gas-Phase Heterogeneous Catalysis with Selectivity Control," Journal of the American Chemical Society 2012, vol. 134, pp. 14345-14348. Four pages.

Morabito, J.V. et al., "Molecular Encapsulation beyond the Aperture Size Limit through Dissociative Linker Exchange in Metal-Organic Framework Crystals," Journal of the American Chemical Society 2014, vol. 136, pp. 12540-12543 and "Supporting Information," Department of Chemistry, Merkert Chemistry Center, Boston College, pp. S-1 to S-15. Total nineteen pages.

Shieh, F-K. et al., "Imparting Functionality to Biocatalysts via Embedding Enzymes into Nanoporous Materials by a de Novo Approach: Size-Selective Sheltering of Catalase in Metal-Organic Framework Microcrystals," Journal of the American Chemical Society 2015, vol. 137, pp. 4276-4279. Four pages.

* cited by examiner

MOLECULAR ENCAPSULATION IN METAL-ORGANIC FRAMEWORK CRYSTALS

CROSS-REFERENCE TO RELATED APPLICATIONS

This application is a § 371 National Phase Application of International Application No. PCT/US2015/045555, filed on Aug. 17, 2015, which claims the benefit under 35 USC 119(e) of U.S. Provisional Application No. 62/038,414, filed on Aug. 18, 2014, both of which are incorporated herein by reference in their entirety.

BACKGROUND OF THE INVENTION

Encapsulating functional guest molecules into the cavities of crystalline porous materials makes it possible to engineer these materials for drug delivery (Horcajada, et al., Nat. Mater. 2010, 9, 172; Rimoli, et al., J. Biomed. Mater. Res. A 2008, 87A, 156), sensing (Yanai, et al., Nat. Mater. 2011, 10, 787; McGilvray, et al., Chem. Commun. 2006, 4401), electrical conductivity (Talin, et al., Science 2014, 343, 66; Cardin, D. J., Adv. Mater. 2002, 14, 553), luminescence (Muller, et al., Photochem. Photobiol. Sci. 2010, 9, 846; Calzaferri, et al., Angew. Chem. Int. Ed. 2003, 42, 3732; Martinez-Martinez, et al., J. Phys. Chem. C 2012, 116, 26084), and energy conversion (Wang, et al., ACS Catalysis 2012, 2, 2630; Son, et al., J. Am. Chem. Soc. 2013, 135, 862; Dutta, et al., J. Phys. Chem. Lett. 2011, 2, 467). Host-guest crystalline porous materials have been studied in aluminosilicate zeolites since the 1980s (Corma, et al., Eur. J. Inorg. Chem. 2004, 2004, 1143).

Approaches for encapsulating large and more diverse guests are still limited to a few specific metal-organic framework (MOF) types. For example, negatively charged MOFs have been utilized to incorporate cationic organic compounds and metals (Li, et al., J. Am. Chem. Soc. 2014, 136, 1202; Alkordi, et al., J. Am. Chem. Soc. 2008, 130, 12639; Larsen, J. Mater. Chem. A 2013, 1, 14133), and MOFs with unoccupied sites can encapsulate guests through dative bonds (Talin, et al., Science 2014, 343, 66). Many MOFs lack framework charge or unoccupied sites, which prohibits the general applicability of these methods. Alternatively, guest molecules have been covalently bound to the bridging ligands of the frameworks (Costa, et al., J. Eur. J. Inorg. Chem. 2008, 1551), but the loss of degrees of freedom for tethered homogeneous catalysts could lead to decreased activity or selectivity in catalytic applications (Lee, et al., Chem. Soc. Rev. 2009, 38, 1450).

Encapsulation of guest molecules in MOFs by diffusion is generally limited to guests that are smaller than the MOF aperture size (Alkordi, et al., J. Am. Chem. Soc. 2008, 130, 12639). This limitation commonly leads to guest molecule leaching, which is particularly problematic for catalytic applications.

There is thus a need in the art for a novel method of encapsulating a guest molecule having a diameter larger than the aperture size of the host, such as a MOF. The present invention fulfills this need.

BRIEF SUMMARY OF THE INVENTION

The present invention relates to a host-guest complex and a method of making the same. The host comprises a metal-organic framework (MOF), and the guest is a molecule having a diameter larger than the aperture size of the MOF.

In one aspect, the MOF comprises metal ions or metal clusters and organic molecule linkers. The invention contemplates any metal ion in the periodic table that can be used for the preparation of a MOF. In certain embodiments, the metal ion is selected from the group consisting of Zn, Cu, Ni, Al, Co, Fe, Mn, Cr, Cd, Mg, Ca, Zr, Gd, Eu, Tb, and mixtures thereof. In other embodiments, the metal ion is selected from the group consisting of Zn, Cu, Fe, Gd, Al, Mg, and mixtures thereof. In one embodiment, the metal ion is Zn. In another embodiment, the metal ion is Fe. In yet another embodiment, the metal ion is Cu. In yet another embodiment, the metal ion is Al.

In certain embodiments, the MOF is selected from the group consisting of ZIFs, UiOs, and MILs. In other embodiments, the MOF is selected from the group consisting of ZIF-8, Fe-BTC, HKUST-1, and MIL-53(Al). In yet other embodiments, the MOF is ZIF-8.

In certain embodiments, the guest molecule is a molecule having a diameter larger than the aperture size of the MOF. In other embodiments, the guest molecule has a diameter smaller than the pore size of the MOF.

In certain embodiments, the guest molecule is selected from the group consisting of a biological agent, a drug, a dye, a nanoparticle, a catalyst, and mixtures thereof.

In another aspect, the invention relates to a method of preparing a host-guest complex. The host comprises a MOF, and the guest is a molecule having a diameter larger than the aperture size of the MOF. The method comprises heating a mixture comprising a MOF, a molecule, and a solvent. In certain embodiments, the mixture is heated at a temperature between about 0° C. and about 200° C. In other embodiments, the mixture is heated at about 100° C. In yet other embodiments, the mixture is heated for a period of time ranging from about 1 hour to about 10 days. In yet other embodiments, the mixture is heated for about seven days.

BRIEF DESCRIPTION OF THE DRAWINGS

The following detailed description of specific embodiments of the invention will be better understood when read in conjunction with the appended drawings. For the purpose of illustrating the invention, there are shown in the drawings specific embodiments. It should be understood, however, that the invention is not limited to the precise arrangements and instrumentalities of the embodiments shown in the drawings.

DETAILED DESCRIPTION OF THE INVENTION

The present invention relates to a host-guest complex and a method of making the same. The host comprises a MOF and the guest comprise a molecule having a diameter larger than the aperture size of the MOF. The host-guest complex can be used for drug delivery, sensing, electrical conductivity, luminescence, catalytic reaction, and energy conversion

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

The term "about" as used herein, when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

As used herein, the term "alkyl" by itself or as part of another substituent means, unless otherwise stated, a straight or branched chain hydrocarbon having the number of carbon atoms designated (i.e., $C_1$-$C_6$ means one to six carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Examples include $C_1$-$C_6$ alkyl, particularly ethyl, methyl, isopropyl, isobutyl, n-pentyl, n-hexyl and cyclopropylmethyl. $C_0$ alkyl corresponds to a bond.

As used herein, the term "analogs" refers to compounds having similar physical, chemical, biochemical, or pharmacological properties. An illustrative example is 2-methylimidazole and imidazole.

As used herein, the term "heterocycle" or "heterocyclyl" or "heterocyclic" by itself or as part of another substituent means, unless otherwise stated, an unsubstituted or substituted, stable, mono or multi cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In certain embodiments, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (particularly 2- and 4-pyrimidinyl), pyridazinyl, thienyl, furyl, pyrrolyl (particularly 2-pyrrolyl), imidazolyl, thiazolyl, oxazolyl, pyrazolyl (particularly 3- and 5-pyrazolyl), isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (particularly 3-, 4-, 5-,6- and 7-indolyl), indolinyl, quinolyl, tetrahydroquinolyl, isoquinolyl (particularly 1- and 5-isoquinolyl), 1,2,3,4-tetrahydroisoquinolyl, cinnolinyl, quinoxalinyl (particularly 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (particularly 3-, 4-, 5-, 6- and 7-benzofuryl), 2,3-dihydrobenzofuryl, 1,2-benzisoxazolyl, benzothienyl (particularly 3-, 4-, 5-, 6-, and 7-benzothienyl), benzoxazolyl, benzothiazolyl (particularly 2-benzothiazolyl and 5-benzothiazolyl), purinyl, benzimidazolyl (particularly 2-benzimidazolyl), benztriazolyl, thioxanthinyl, carbazolyl, carbolinyl, acridinyl, pyrrolizidinyl, and quinolizidinyl.

The term "Metal Organic Framework", also termed MOF, refers to a crystalline compound consisting of metal ions coordinated to rigid organic molecules to form one-, two-, or three-dimensional structures that are highly porous.

As used herein, the term "M-PPh$_3$" refers to transition metal catalyst having at least one triphenylphosphine as a ligand. "M" refers to a transition metal is defined as an element whose atom has a partially filled d sub-shell, or which can give rise to cations with an incomplete d sub-shell. Non-limiting examples of M-PPh$_3$ are tetrakis(triphenylphosphine)palladium(0); RhCl(PPh$_3$)$_3$; trans-IrCl(CO)(PPh$_3$)$_2$; NiCl$_2$(PPh$_3$)$_2$; and [(PPh$_3$)CuH]$_6$.

As used herein, the term "aperture size" of a MOF refers to the size of the connection windows between pores.

As used herein, the term "pore size" of a MOF refers to the diameter of the pore.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

The present invention relates a host-guest complex and a method of making the same. The host comprises a MOF and the guest comprise a molecule having a diameter larger than the aperture size of the MOF.

Host-Guest Complexes

The host-guest complex of the invention refers to a guest encapsulated in a host. In certain embodiments, the host comprises a MOF and the guest comprises a molecule having a diameter larger than the aperture size of the MOF. In certain embodiments, the guest molecule has a diameter smaller that the pore size of the MOF.

A MOF comprises two components: a metal ion and an organic molecule linker. The organic linker are typically mono-, di-, tri-, or tetravalent ligands.

The invention contemplates any metal ion in the periodic table that can be used for the preparation of a MOF. Non-limiting metal ions are recited in the following groups: alkali metals (Li, Na, K, Rb, Cs, Fr), alkaline earth metals (Be, Mg, Ca, Sr, Ba, Ra), transition metals (Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg) and post-transition metals (Al, Ga, In, Tl, Sn, Pb, Bi), as well as metalloids (B, Si, Ge, As, Sb, Te, Po), lanthanides (La, Ce, Pr, Nd, Pm, Sm, Eu, Gd, Tb, Dy, Ho, Er, Tm, Yb, Lu) and actinides (Ac, Th, Pa, U, Np, Pu, Am, Cm, Bk, Cf, Es, Fm, Md, No, Lr). Metals not mentioned herein, or newly discovered metals, may also be used in the methods of the invention. In one embodiment, the metal ion is at least one selected from the group consisting of Zn, Cu, Ni, Al, Co, Fe, Mn, Cr, Cd, Mg, Ca, Zr, Gd, Eu, Tb, and mixtures thereof. In other embodiments, the metal ion is at least one selected from the group consisting of Zn, Cu, Fe, Gd, Al, Mg, and mixtures thereof.

The metal ion or ions coordinate with one or more organic molecule linkers that act like ligand for the metal ion(s). The organic ligands according to the invention can be bidentate, tridentate, tetradentate or pluridentate, in that they may coordinate two, three, four or multiple metal ions through dative bonds. The ability to coordinate metal ions is conferred by certain functional groups of the organic linker. Non-limiting functional groups that can be contained by the organic linker to form a MOF are —COOH, —CSSH, —NO$_2$, —B(OH)$_2$, —SO$_3$H, —Ge(OH)$_3$, —Sn(OH)$_3$, —Si(SH)$_4$, —Ge(SH)$_4$, —Sn(SH)$_3$, —PO$_3$H, —AsO$_3$H, —AsO$_4$H, —P(SH)$_3$, As(SH)$_3$, C$_4$H$_2$O$_4$, —RSH, —RNH$_2$, —RNR—, —ROH, —RCN, —PO(OR)$_2$, —RN$_3$, wherein R is hydrogen, C$_{1-10}$ alkyl, alkylene, heterocycle, heteroaryl, or aryl group.

In certain embodiments, the organic linker contains functional groups selected from the group consisting of a carboxylate, a phosphonate, an amine, an azide, a cyanide, a squaryl, an imidazole, and mixtures thereof.

An illustrative example of a copper-based MOF is a Cu$_3$(benzenetricarboxylic)$_2$ (HKUST-1; MOF-199) unit.

An illustrative example of a zinc-based MOF is ZIF-8.

An illustrative example of an iron-based MOF unit is MIL-100(Fe). MIL-100(Fe) is a large-pore iron (III) carboxylate with a zeotype architecture.

An illustrative example of a chromium-based MOF unit is a chromium(III) terephthalate (MIL-101) unit.

Illustrative examples of other suitable MOF include MIL-53 comprising Al, Cr or Fe; MIL-47 comprising V; MIL-100 comprising Cr; and MIL-101 comprising Cr.

Further examples of suitable MOFs include zeolitic imidazolate frameworks (ZIF). Twelve ZIFs (termed ZIF-1 to -12) have been synthesized as crystals by copolymerization of either Zn(II) (ZIF-1 to -4, -6 to -8, and -10 to -11) or Co(II) (ZIF-9 and -12) with imidazolate-type links. The ZIF crystal structures are based on the nets of seven distinct aluminosilicate zeolites: tetrahedral Si(Al) and the bridging O are replaced with transition metal ion and imidazolate link, respectively. In addition, examples of mixed-coordination imidazolates based on garnet nets include Zn(II) and In(III) (ZIF-5). A typical example is ZIF-8, made by zinc ions coordinated by four imidazolate rings.

In certain embodiments, the MOF is selected from the group consisting of ZIFs, UiOs, and MILs. In other embodiments, the MOF is selected from the group consisting of ZIF-8, Fe-BTC, HKUST-1, and MIL-53(Al). In yet other embodiments, the MOF is ZIF-8.

The guest molecule of the invention has a diameter larger than the aperture size of the host MOF. In certain embodiments, the diameter of the guest molecular is about 1.1-5 times of the aperture size of the host MOF. In other embodiments, the diameter of the guest molecular is about 3-4 times of the aperture size of the host MOF. In yet other embodiments, the molecule is selected from the group consisting of a biological agent, a drug, a dye, a catalyst, a nanoparticles, and mixtures thereof. In yet other embodiments, the molecule is Rhodamine 6G or $PPh_3$. In another embodiment, the molecule is M-$PPh_3$.

Method of Making a Host-Guest Complex

The present invention provides a method of making a host-guest complex comprising a MOF as the host and a molecule as the guest, wherein the guest molecule has a diameter larger than the aperture size of the MOF. In certain embodiments, the guest molecule has a diameter smaller than the pore size of the host MOF.

The method of the invention takes advantage of ligand exchange reactions to "open" part of the framework of the MOF crystals, resulting in the expansion of the aperture size of the MOF and allowing the guest molecule to diffuse into the MOF pore. After guest incorporation, association of the ligand closes the large aperture, trapping the guest molecule in the MOF pore. A practical advantage of this approach is that MOF production can be scaled-up independently of guest molecule loading, which is especially relevant since several MOFs, such as ZIF-8, Fe-BTC, HKUST-1, and MIL-53(Al), have been become commercially available.

In certain embodiments, the method of the invention comprises heating a mixture comprising a MOF, a guest molecule, and a solvent. In certain embodiments, the mixture is heated at a temperature between about 0° C. and about 200° C. In other embodiments, the temperature is about 100° C. In yet other embodiments, the temperature is about 25° C.

In certain embodiments, the mixture is heated between about 1 hour and about 10 days. In one embodiment, the mixture is heated for about 7 days.

Any inorganic or organic solvent can be used within the methods of the invention to facilitate the linker exchanges. In certain embodiments, the solvent is selected from the group consisting of a $C_{1-6}$-alkyl alcohol, dimethyl sulfoxide (DMSO), N,N-dimethylformamide (DMF), N,N-diethylformamide (DEF), N,N-dimethylacetamide (DMAc), acetonitrile, toluene, dioxane, benzene, chlorobenzene, methyl ethyl ketone (MEK), pyridine, tetrahydrofuran (THF), ethyl acetate, glycol, N-methylpyrrolidone (NMP), gamma-butyrolactone, alicyclic alcohols such as cyclohexanol, ketones such as acetone or acetylacetone, cycloketones such as cyclohexanone, sulfolene and mixtures thereof. In other embodiments, the solvent is n-butanol. In yet other embodiments, the solvent is acetonitrile. In yet other embodiments, the solvent is DMF.

In other embodiments, the method of the invention comprises heating a mixture comprising a MOF, a guest molecule, an exogenous linker, and a solvent. The exogenous linker is a compatible and chemically distinct ligand from the organic linker contained in the MOF (endogenous linker). The exogenous linker does not disrupt the underlying MOF crystal structure and morphology. In certain embodiments, the exogenous linker is an analog of the endogenous linker. Without wishing to be limited by any theory, the exchange between the endogenous linker and exogenous linker creates short-lived linker vacancies that would momentarily expand the aperture size to allow the passage of the larger guest molecule into the framework. Subsequent reincorporation of the dissociated linker reassembles the MOF with an aperture size that is smaller than the encapsulated guest molecule.

Figure 2A:
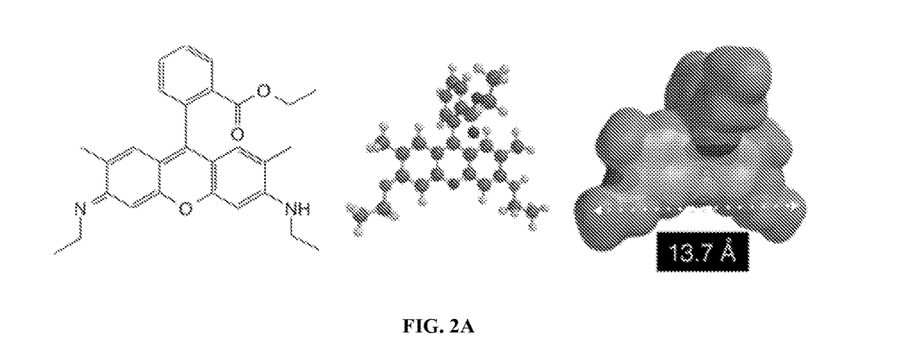
FIG. 2A illustrates molecular representations of Rhodamine 6G (R6G).
Figure 2B:
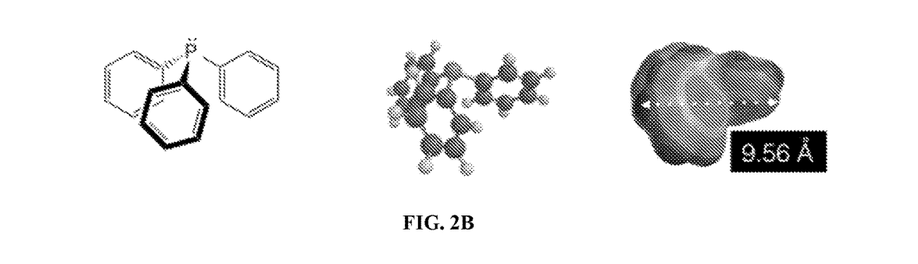
FIG. 2B illustrates molecular representations of triphenylphosphine.

As demonstrated in the Examples, the methods of the invention were enabled by using commercially available zeolitic imidazolate framework ZIF-8 as a model MOF. First, to maximize guest retention, the guest molecule should be larger than the MOF aperture size. For encapsulation in ZIF-8, this requirement makes the ideal guest size between ~3.4 and 11.6 Å, the aperture and pore sizes of ZIF-8, respectively. Second, in order to better quantify the loading, guest molecules that could be easily detectable by UV-Vis spectroscopy were initially targeted. Rhodamine 6G (R6G) was selected as an ideal candidate that meets both criteria outlined above: it is a fluorescent dye ($\lambda_{max}$=530 nm) with a molecular diameter of 11.3-13.7 Å (FIGS. 2A and 2B). The amounts of encapsulated R6G were determined by UV-Vis spectroscopy after acid digestion of the ZIF-8 crystals.

The methods of the invention capitalize on the existence of linker exchange reactions, proceeded by a competition between associative and dissociative exchange mechanisms, and do not require any specific electrostatic interaction between the guest and the MOF host, which may significantly expand the scope of molecular guests and MOF hosts suitable for forming host-guest complex.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Methods

Chemicals and Materials: General Considerations

Unless otherwise stated, all the reactions were carried out in the air without taking any precaution to protect reactions from oxygen or moisture. Zinc nitrate hexahydrate (Aldrich, 99%), 2-methylimidazole (Aldrich, 99%), imidazole (Alfa Aesar, 99%), Basolite Z1200 (ZIF-8, Aldrich, produced by BASF), n-butanol (Alfa Aesar,≥99.4%), N,N'-dimethylformamide (Alfa Aesar, ≥99.8%), Rhodamine 6G (Acros, dye content ~95%), triphenylphosphine (Aldrich), sodium hydroxide (VWR), polyvinylpyrrolidone (PVP, Mw~29,000, Aldrich), deuterium oxide (Aldrich, 99.9 atom % D), and sulfuric acid-d2 solution (96-98 wt. % in D2O, 99.5 atom % D) were purchased from the indicated sources and used without further purification.

Characterization

Transmission electron microscope (TEM) images were obtained on JEOL JEM2010F operated at 200 kV. The powder x-ray diffraction patterns (PXRD) were collected on a Bruker AXS diffractometer with Cu Kα radiation ($\lambda$=1.5418 Å). $^1$H NMR spectra obtained for the kinetic experiments were recorded on a Varian (Agilent) (600 MHz) spectrometer. The line listing for the NMR spectra are reported as chemical shift in ppm. The nitrogen gas adsorption-desorption was carried out on Micromeritics ASAP 2020 provided by the University of Massachusetts Boston. Visible light absorption spectra were measured on a Thermo Scientific NanoDrop 2000c.

Visible Light Absorption Spectroscopy

Dried R6G@ZIF-8 (10 mg) was digested in a 1 wt % hydrochloric acid/methanol solution (2 mL). After stirring for 1 minute, the resulting solution was transferred to a glass cuvette to measure the visible light absorption spectrum at 530 nm on a Thermo Scientific NanoDrop 2000c. The amount of R6G loading was determined by calibration curve between absorbance of light at 530 nm and R6G concentration ($\epsilon$=0.0934 $\mu M^{-1}$ $cm^{-1}$ at 530 nm).

Molecular Size Calculations

The molecular sizes of R6G and triphenylphosphine were estimated by using the Spartan 10 software package to minimize structures using the Hartree-Fock method with the basis set 3-21G. The greatest interatomic distances for each molecule are given as the effective molecular sizes in FIG. 2.

Example 1: R6G Loading Via Linker Exchange

Variable amounts (9.3 mg/0.02 mmol, 29.2 mg/0.06 mmol, 73.9 mg/0.15 mmol, and 292.4 mg/0.61 mmol) of Rhodamine 6G (R6G) were placed in a 20 mL glass scintillation vial. 2-methylimidazole (Hmim) (181 mg, 2.2 mmol) and activated ZIF-8 crystals (75 mg, 0.33 mmol Zn(mim)$_2$) were added to the vial with the guest molecules. Next, n-butanol or DMF (15 mL) was added to the vial, and the solids were suspended by sonication for 10 minutes. The vial was capped and placed in an isothermal oven at 100° C. for 7 days. The guest-loaded ZIF-8 was collected by centrifugation at 5000 rpm for 10 minutes. The solid precipitate was triturated by decanting the methanol supernatant then re-suspended into fresh methanol (10 mL). The centrifugation and trituration steps were repeated at least 5 times until the supernatant was completely transparent. The residual solvent was removed from the isolated solids in a vacuum oven at 100° C. overnight. The mass recovery of the product was 92%.

Example 2: PPh$_3$ Loading Via Linker Exchange

Variable amounts of PPh$_3$ (866 mg/3.3 mmol and 649 mg/2.5 mmol) were placed in a 20 mL scintillation vial. 2-methylimidazole (181 mg, 2.2 mmol) and activated ZIF-8 crystals (75 mg, 0.33 mmol Zn(mim)$_2$) were added to the vial with the guest molecules. Next, n-butanol (15 mL) that had been sparged with Ar gas for 30 min to remove dissolved O$_2$ was added to the vial. The vial was capped and the solids were suspended by sonication for 10 minutes. The vial was placed in an isothermal oven at 100° C. for 7 days. The guest-loaded ZIF-8 was collected by centrifugation at 5000 rpm for 10 minutes. The solid precipitate was triturated by decanting the methanol supernatant then re-suspended into fresh methanol (10 mL). The centrifugation and trituration steps were repeated at least 5 times. The residual solvent was removed from the isolated solids in a vacuum oven at 100° C. overnight. The mass recovery of the product was 92%.

Example 3: Effect of Exogenous Linker Concentration

The R6G (73.9 mg, 0.15 mmol) and activated ZIF-8 crystals (75 mg, 0.33 mmol Zn(mim)$_2$) were placed in a 20 mL scintillation vial. Variable amounts (0 mg, 60.3 mg/0.73 mmol, 120.6 mg/1.47 mmol, 181.0 mg/2.21 mmol, and 482.4 mg/5.88 mmol) of 2-methylimidazole were added to the vial with the guest and ZIF-8 mixture. Next, n-butanol (15 mL) was added to the vial, and the solids were suspended by sonication for 10 minutes. The vial was capped and placed in an isothermal oven at 100° C. for 7 days. The guest-loaded ZIF-8 was collected by centrifugation at 5000 rpm for 10 minutes. The solid precipitate was triturated by decanting the methanol supernatant then re-suspended into fresh methanol (10 mL). The centrifugation and trituration steps were repeated at least 5 times until the supernatant was completely transparent. The residual solvent was removed from the isolated solids in a vacuum oven at 100° C. overnight.

Example 4: Synthesis of Micron-Sized ZIF-8

A 25 mM solution of Zn(NO$_3$)$_2$.6H$_2$O in methanol (0.125 mmol, 5 mL) was combined with a 25 mM solution of 2-methylimidazole (0.125 mmol, 5 mL) in a 20 mL scintillation vial. The reaction was carried out at room temperature for 24 hours without stirring. The product was collected by centrifugation at 5000 rpm for 10 minutes. The solid precipitate was triturated by decanting the methanol supernatant then re-suspended with fresh methanol (10 mL). The centrifuging and trituration steps were repeated 3 times. The residual solvent was removed from the isolated solids in a vacuum oven at 100° C. overnight. The yield of ZIF-8 was 8.4%.

Example 5: Synthesis of Nano-Sized ZIF-8

Zn(NO$_3$)$_2$.6H$_2$O (150 mg, 0.504 mmol) and 2-methylimidazole (330 mg, 4.02 mmol) were weighed and transferred to a 30 mL glass jar and 20 mL scintillation vial, respectively. The solids were dissolved in methanol (7.15 mL each). The glass jar was then equipped with a magnetic stir bar, and placed on a stir plate. Next, under vigorous stirring, the 2-methylimidazole solution was poured into the jar and the mixture was stirred at room temperature for 6 hours. The product was collected by centrifugation at 7000 rpm for 10 minutes. The solid precipitate was triturated by decanting the methanol supernatant then re-suspended with fresh methanol (10 mL). The centrifuging and trituration steps were repeated 3 times. The residual solvent was removed from the isolated solids in a vacuum oven at 100° C. overnight. The yield of ZIF-8 was 83%.

Example 6: PVP Washing

Dried R6G@ZIF-8 (15 mg) was suspended in a 14 wt. % PVP/methanol solution (10 mL) by sonication for 10 minutes. The solid precipitate was collected by trituration after centrifugation at 5000 rpm for 10 minutes. The isolated solid was then re-suspended with fresh 14 wt. % PVP/methanol (10 mL), and the centrifugation and trituration steps were repeated at least 5 times until R6G content was constant as determined by UV-Vis absorption spectroscopy. The PVP-washed product was then re-suspended with 10 mL methanol to remove any excess PVP, and the final product was collected by centrifugation at 5000 rpm for 10 minutes and decanting of the supernatant. The solid was then dried overnight in vacuum oven at 100° C. to remove any residual solvent. The mass recovery was 66%.

Example 7: Linker Exchange Kinetics

Figure 3:
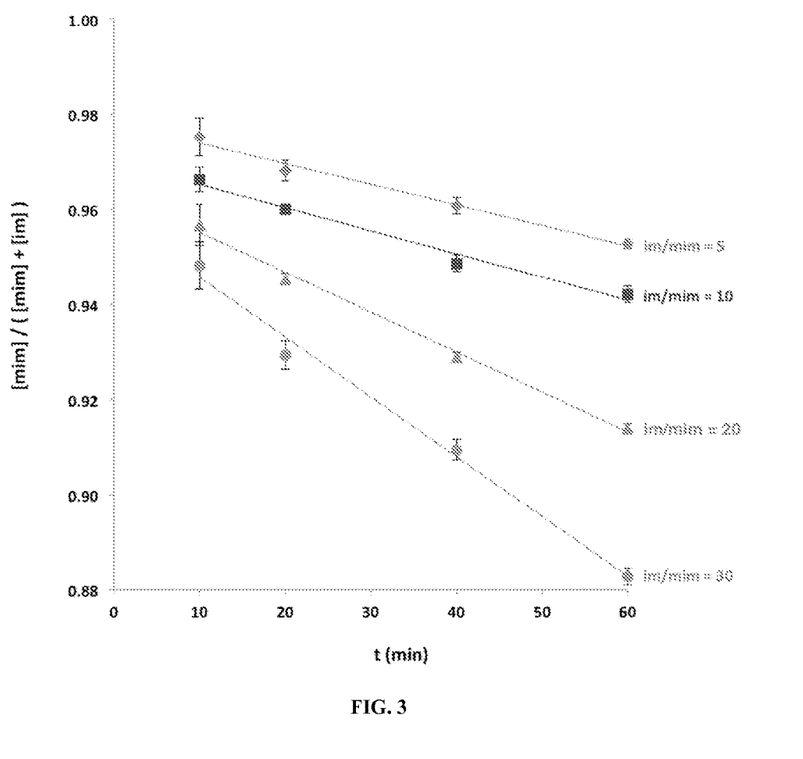
FIG. 3 illustrates plots of conversion vs. time of the $Zn(mim)_2$ to $Zn(mim)_{2-x}(im)_x$ exchange reaction at varying concentrations of imidazole, the exogenous linker, with conversion expressed as the disappearance of 2-methylimidazole from the framework as a molar fraction of the total imidazolate linker content of the solid mim=2-methylimidazole. im=imidazole. Least squares linear regressions are shown.

The kinetics of exchange of $Zn(mim)_2$ (ZIF-8) with exogenous imidazole (Him) to yield $Zn(mim)_{2-x}(im)_x$ (SALEM-2) were followed using a modified procedure based on Yanai, et al., Nat. Mater. 2011, 10, 787. Due to the heterogeneous nature of the exchange reaction, accurate sampling could not be guaranteed, and thus, for the kinetics experiment, each point shown in FIG. 3 is the result of independent measurements carried out at different reaction times. Generally, each reaction was repeated three times, the average of which is used for the kinetic fits.

$Zn(mim)_2$
ZIF-8

$Zn(mim)_{2-x}(im)_x$
SALEM-2

Dried ZIF-8 (5.0 mg, 0.022 mmol $Zn(mim)_2$) was placed in a 3 mL glass serum vial. Solids were suspended by sonication in an appropriate volume of n-butanol (tabulated below) before the reaction was initiated with exogenous linker. A 588 mM solution of imidazole in n-butanol was added in an appropriate volume (see below), and vials were immediately sealed with PTFE-lined aluminum crimp caps, shaken manually for 5 s, and placed into the aluminum heating blocks of a Labmate synthesizer thermostated at 70° C. The reactions were incubated at 70° C. with 450 rpm shaking for a predetermined amount of time, as indicated in FIG. 3.

|  | im/mim (mol/mol) | | | |
| --- | --- | --- | --- | --- |
|  | 5 | 10 | 20 | 30 |
| Vol. n-butanol (mL) | 2.625 | 2.250 | 1.500 | 0.750 |
| Vol. 588 mM Him (mL) | 0.375 | 0.750 | 1.500 | 2.250 |

At the end of the allocated time, the vials were removed and immediately immersed in a water bath held at 0° C. Suspended solids were transferred quickly into 3 mL of methanol chilled at 0° C. in a 15 mL centrifuge tube and centrifuged at 3300 rpm for 5 min. The solid precipitate was triturated by decanting the supernatant, and the product was re-suspended in fresh methanol (6 mL). The centrifugation and trituration was repeated 3 times with 6 mL of methanol each time. The isolated solids were transferred to pre-weighed glass vials and the residual solvent was removed in a vacuum oven at 100° C. overnight. Dried samples were weighed and then digested in a solution of 0.900 mL deuterium oxide and 0.100 mL 98% d2-sulfuric acid in $D_2O$ along with tetramethylammonium bromide (0.7 mg) that was used as an internal standard for analysis by $^1$H-NMR spectroscopy (FIG. 4).

The spin-lattice relaxation times ($T_1$) of each proton in solution were determined by the inversion recovery method and are detailed in Table 1. In light of the measured relaxation times, $^1$H-NMR spectra were acquired using an acquisition time (at) of 18 s and an interpulse delay (d1) of 54 s, in order to make (at+d1)~5×the longest $T_1$. A pulse angle of 90° was used and 16 transients were taken per acquisition.

Figure 4:
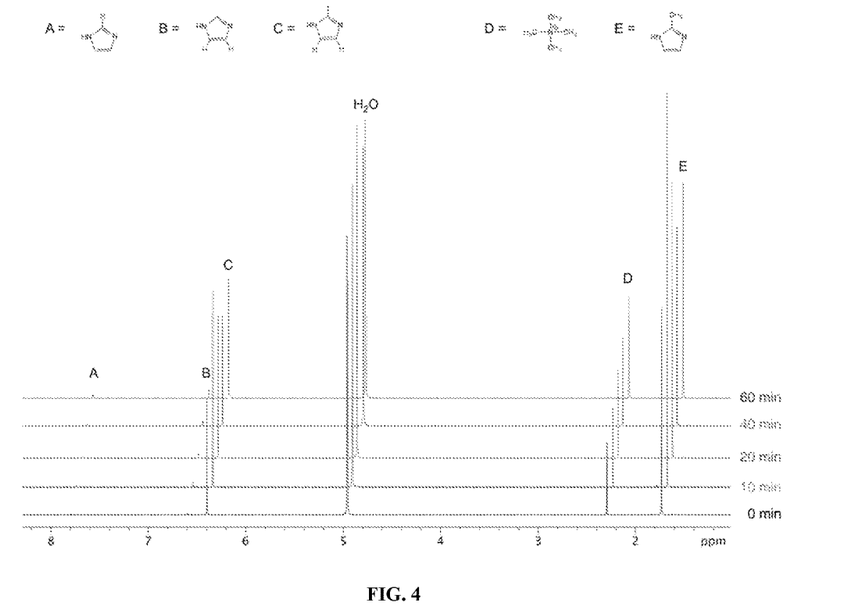
FIG. 4 illustrates representative $^1$H-NMR spectra of acid-digested $Zn(mim)_{2-x}(im)_x$ over the course of the exchange reaction for the series with im/mim=30.

The quantity of imidazole and 2-methylimidazole in solution were determined using the formulae:

AP=area determined by integration of peak (P), as defined in FIG. 4

$$\left(A_A \times \frac{[TMA^+]}{A_D} \times \frac{12 \text{ protons}}{1 \text{ protons}}\right) + \left(A_B \times \frac{[TMA^+]}{A_D} \times \frac{12 \text{ protons}}{2 \text{ protons}}\right) = 2[im]$$

$$\left(A_C \times \frac{[TMA^+]}{A_D} \times \frac{12 \text{ protons}}{2 \text{ protons}}\right) + \left(A_E \times \frac{[TMA^+]}{A_D} \times \frac{12 \text{ protons}}{3 \text{ protons}}\right) = 2[mim]$$

$$\frac{[mim]}{[im] + [mim]} = \text{conversion}$$

TABLE 1

| proton (in red) | H-im (7.85) | HN-im-H (6.66) | HN-im-CH (6.45) | $H_2O$ | $TMA^+$ | 2-Me-im |
| --- | --- | --- | --- | --- | --- | --- |
| δ (ppm) | 7.85 | 6.66 | 6.45 | 4.94 | 2.35 | 1.79 |
| $T_1$ (s) | 13.74 ± 0.28 | 12.06 ± 0.21 | 9.72 ± 0.26 | 3.01 ± 0.11 | 5.65 ± 0.12 | 4.44 ± 0.32 |

Table 1 shows the spin-lattice relaxation times ($T_1$) determined for each proton in the acid-digested solutions of the Zn(mim)2-x(im)x products, which were used to choose the acquisition parameters given in the kinetics section.

From the $^1$H-NMR data, a plot of conversion versus time was made at each concentration, using the average deviation to estimate error (FIG. 3). To obtain the observed rate constants ($k_{obs}$) used in FIG. 5, linear regression analysis of the data collected at time points from 10 minutes to 60 minutes was carried out, with the slope m being $k_{obs}$. Values of $k_{obs}$ and the accompanying $R^2$ values for the linear fits are outlined in Table 2. In order to estimate the error in the $k_{obs}$ values that were obtained from the conversion vs. time plots in FIG. 3, two outlying cases were considered, both high and low, using the bound limits (from average deviation) of the conversion values at 10 and 60 min. For the high estimate of $k_{obs}$, a linear regression of a four-point plot was obtained of (1) the upper bound for the 10 min point, (2) the average value for the 20 min point, (3) the average value for the 40 min point, and (4) the lower bound for the 60 min point. For the low estimate, the low bound for the 10 min point, the upper bound for the 60 min point was used, keeping the other two points the same.

TABLE 2

| im/mim (mol/mol) | [im] (M) | $k_{obs}$ (s$^{-1}$) | $R^2$ |
|---|---|---|---|
| 5 | 0.0735 | 7.2 (±1.3) × 10$^{-6}$ | 0.98622 |
| 10 | 0.147 | 8.1 (±1.2) × 10$^{-6}$ | 0.98121 |
| 20 | 0.249 | 14.0 (±1.3) × 10$^{-6}$ | 0.99413 |
| 30 | 0.441 | 21.0 (±1.8) × 10$^{-6}$ | 0.99036 |

Table 2 shows the observed rate constants ($k_{obs}$) determined by the method of initial rates ($k_{obs}$=slope m) from the conversion vs. time plots in FIG. 3, with the coefficients of determination ($R^2$) for each linear fit.

The ability for ligands to exchange between metal centers is ubiquitous in coordination chemistry, where the two limiting mechanisms for ligand substitution reactions are associative or dissociative mechanisms. In a MOF, the metals are typically coordinatively saturated, a property that was reasoned would make a dissociative mechanism more likely. If dissociative linker substitution occurs in MOFs, the existence of short-lived linker vacancies was hypothesized, which would momentarily expand the pore aperture size to allow the passage of larger guests into the framework. Subsequent reincorporation of the dissociated linker reassembles the MOF with an aperture size that is smaller than the incorporated guest.

Example 8: Linker Exchange can Facilitate Guest Encapsulation

Figure 6A:
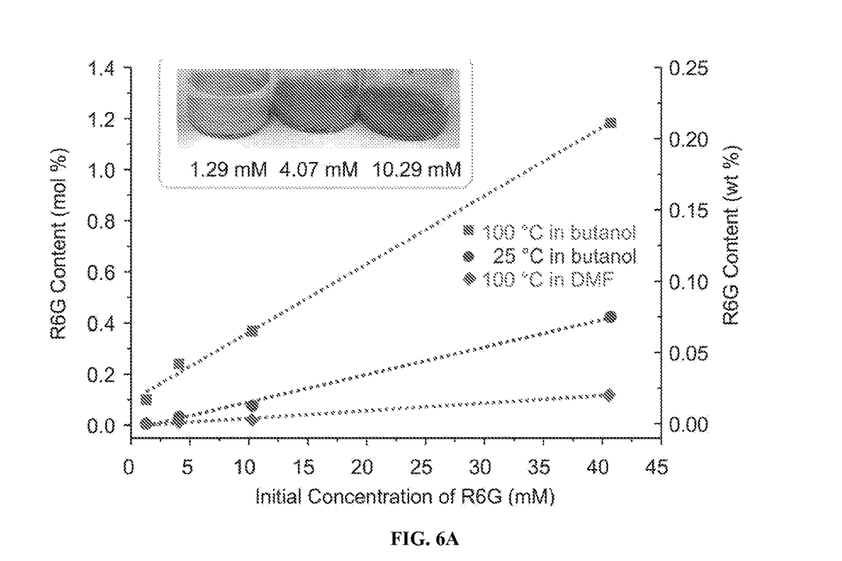
FIG. 6A illustrates the effects of solvent and temperature on R6G encapsulation. Inset image shows ZIF-8 after R6G encapsulating at various concentration during linker exchange at 100° C. in n-butanol.
Figure 6B:
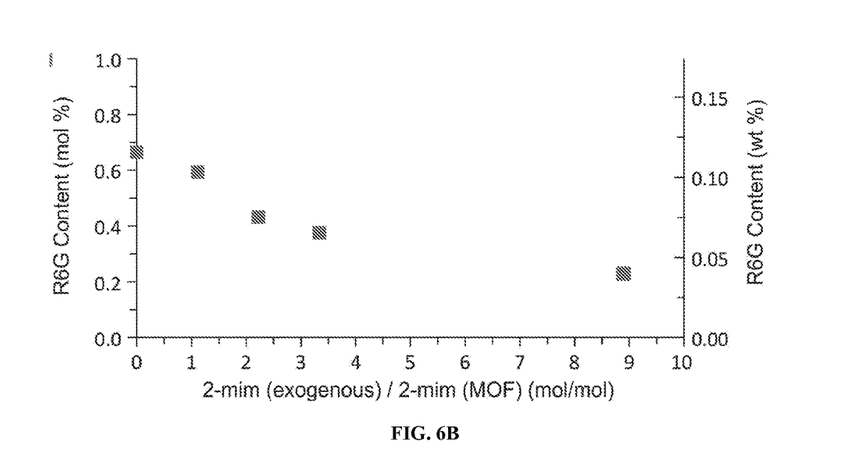
FIG. 6B illustrates effects of the exogenous linker on the R6G encapsulation. Reaction conditions: 10.29 mM of R6G at 100° C. in n-butanol for 7 days.
Figure 7:
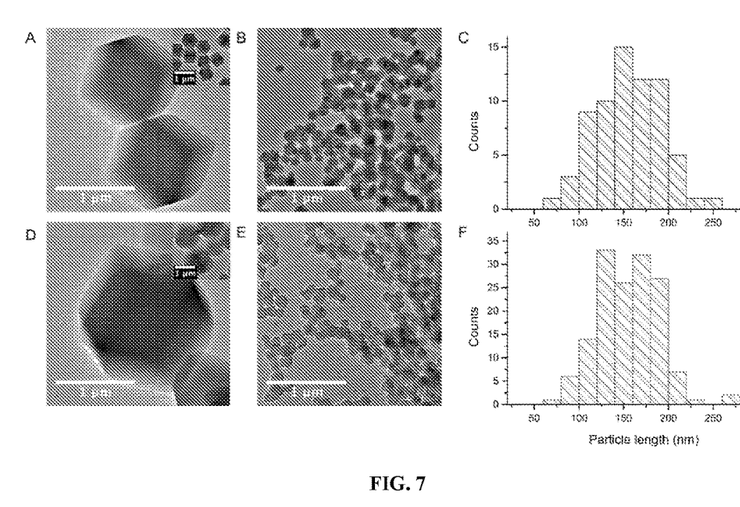
FIG. 7 illustrates transmission electron microscope (TEM) images and particle size distributions (PSDs) of various ZIF-8 crystals. Panel A illustrates the TEM image of micron-sized ZIF-8. Panel B illustrates the TEM image of nano-sized ZIF-8. Panel C illustrates the PSD of nano-sized ZIF-8. Panel D illustrates the TEM image of micron-sized ZIF-8 encapsulating R6G. Panel E illustrates the TEM image of nano-sized ZIF-8 encapsulating R6G. Panel F illustrates the PSD of nano-sized ZIF-8 encapsulating R6G. The encapsulation was carried out with 10.3 mM R6G at 100° C. for 7 days in n-butanol.
Figure 8:
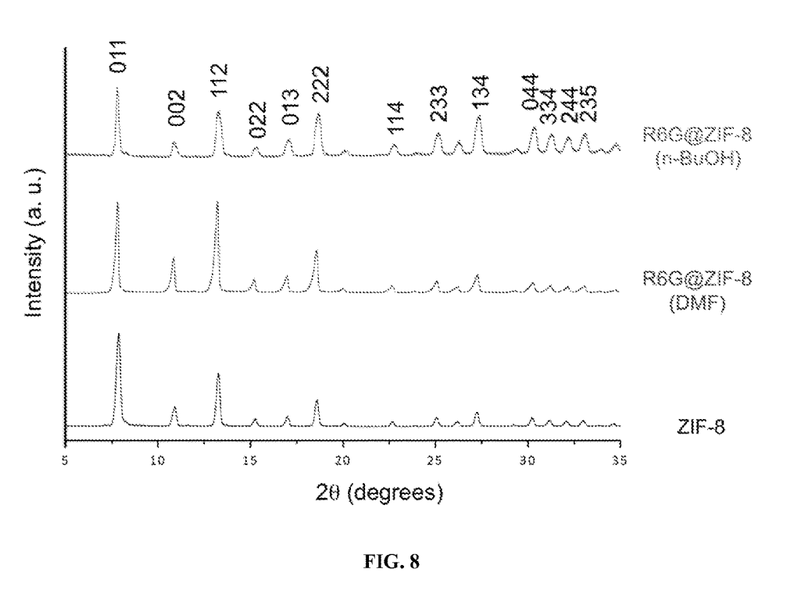
FIG. 8 illustrates the powder X-ray diffraction patterns of R6G@ZIF-8. The R6G encapsulation was carried out with 10.3 mM R6G at 100° C. for 7 days in n-butanol and in DMF. The pattern for pure ZIF-8 crystals is given for reference.

To test whether linker exchange can facilitate guest incorporation, R6G was incubated with ZIF-8 in the presence of 2-methylimidazole as an exogenous linker in n-butanol at 100° C. for 7 days (FIGS. 6A and 6B). Exchange of the 2-methylimidazole linker in ZIF-8 with imidazole has been reported under these conditions. After the reaction, the material, henceforth referred to as R6G@ZIF-8, took on a cloudy light pink hue. The structure of the guest encapsulation products was characterized by transmission electron microscopy (TEM) and powder X-ray diffraction (PXRD). Both techniques show no apparent differences after guest encapsulation, suggesting that the guest loading method was not destructive (FIG. 7 and FIG. 8).

Example 9: Confirmation of Encapsulation of R6G in ZIF-8

Figure 9:
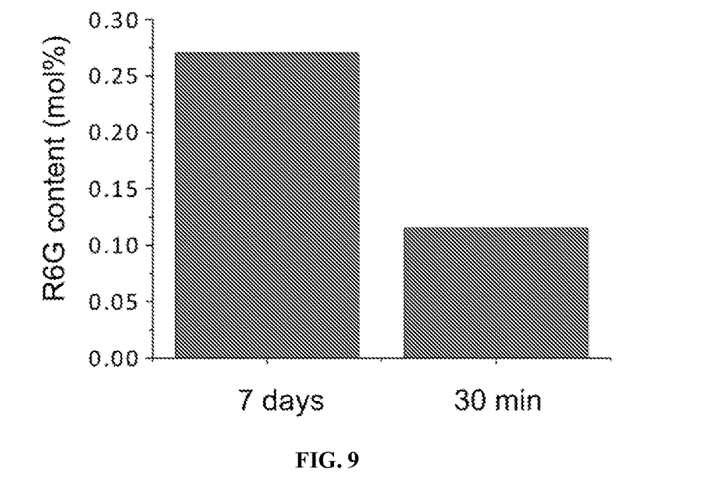
FIG. 9 illustrates the interaction between R6G and ZIF-8 surface over time. Reaction conditions: 10.3 mM R6G, n-butanol, 25° C.
Figure 10:
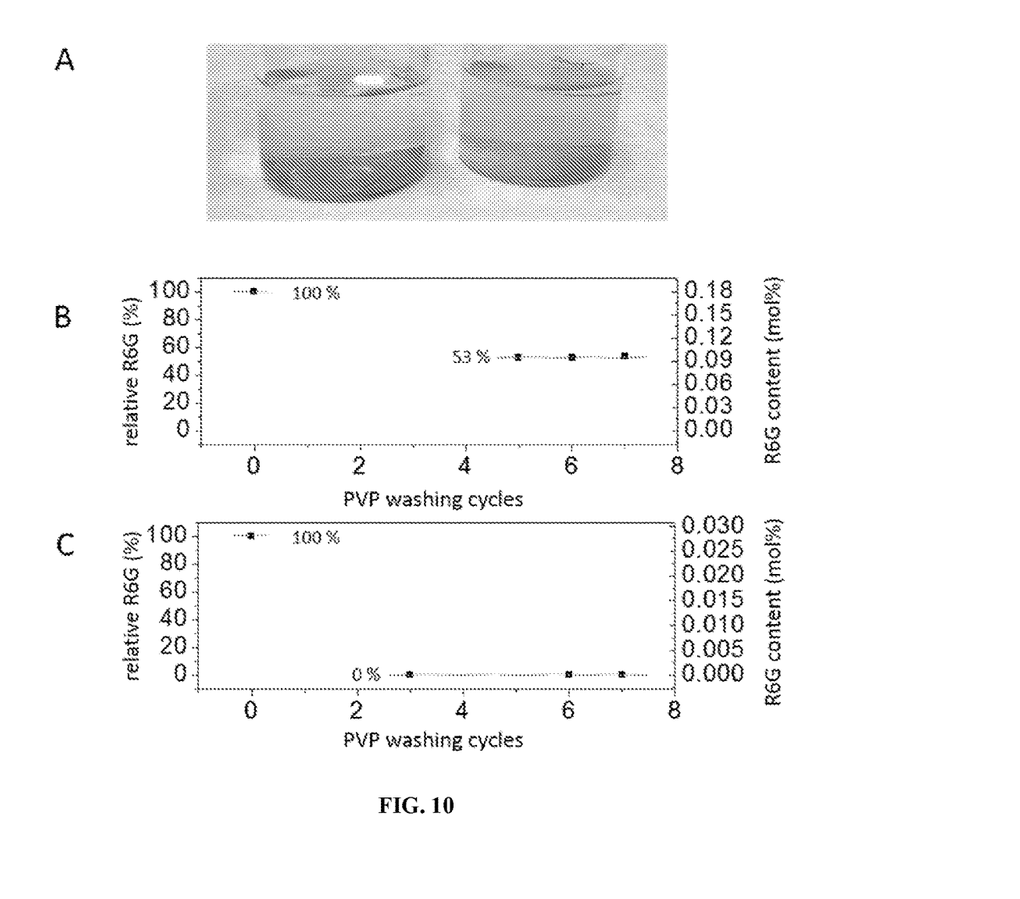
FIG. 10 illustrates the results of polyvinylpyrrolidone (PVP) washing experiments. Panel A is a digital photograph of R6G@ZIF-8 precipitates and supernatants after centrifugation. Left beaker shows synthesized R6G@ZIF-8 after 5 times methanol washing. Right beaker shows methanol-washed R6G@ZIF-8 re-suspended in 14 wt. % PVP/methanol solution. Surface bound R6G was washed by PVP solution. Panel B illustrates R6G content tracking by absorbance after PVP washing cycles. The R6G encapsulation was carried out with 1.29 mM R6G in n-butanol at 100° C. for 7 days. Panel C illustrates R6G content tracking by absorbance after PVP washing cycles. The R6G encapsulation was carried out with 1.29 mM R6G in n-butanol at 25° C. for 10 min.

To confirm that the R6G is indeed incorporated in ZIF-8 instead of attaching to its surface, a method to remove the surface bound R6G in all samples prior to UV-Vis analysis was sought out. The affinity of R6G for ZIF-8 likely arises from its ester and amine functional groups, which can interact with the hydrophilic external surfaces of ZIF-8. It was discovered that briefly exposing ZIF-8 to R6G at room temperature led to the coloration of the MOF, despite linker exchange not occurring to an appreciable extent (FIG. 9). To remove surface bound R6G from ZIF-8, the samples were washed with methanolic solutions of polyvinylpyrrolidone (PVP), a polar polymer with poly-ketone functional groups that interact strongly with MOF crystals due to the polyvalency effect. Due to its large size, PVP cannot penetrate the interior of ZIF-8. Therefore, any R6G that remains associated with ZIF-8 after PVP washing is likely trapped in the pores of ZIF-8 rather than on its surface. As expected, repeated washings of R6G@ZIF-8 with PVP led to the liberation of some R6G, but after repeated PVP washings, the pink color of R6G@ZIF-8 remained (FIG. 10). Analysis of the PVP washed R6G@ZIF-8 by UV/Vis allowed for the encapsulation efficiency of R6G in R6G@ZIF-8 to be quantitatively determined. A similar PVP washing procedure carried out under conditions where linker exchange does not occur led to full removal of R6G from the ZIF-8 crystals (FIG. 10).

Example 10: Effects of Temperature, Solvent, and Initial Concentration of R6G on R6G Encapsulation in ZIF-8

Figure 11:
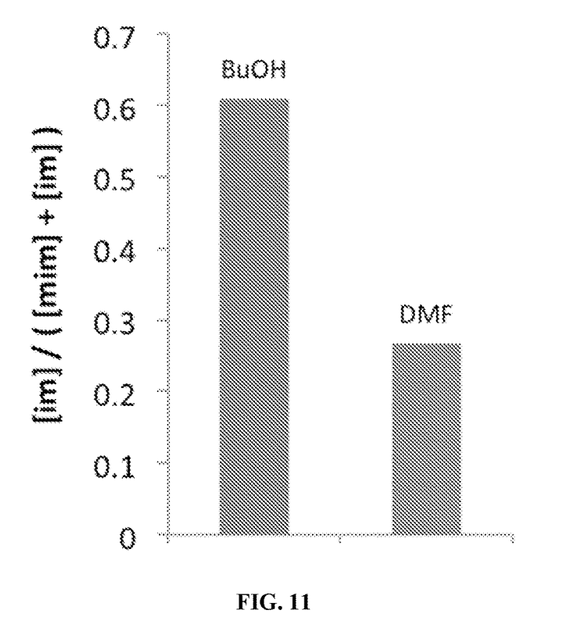
FIG. 11 illustrates the solvent effects on the linker exchange after 18 hours at 100° C. in n-butanol and DMF following the method described for obtaining kinetic information.

After R6G was removed from the surface, the effects of temperature, solvent, and initial concentration of R6G on R6G encapsulation in ZIF-8 were studied (FIGS. 6A and 6B). This study indicated that guest loading was temperature and solvent dependent. Higher encapsulation was observed at higher temperatures due to increased linker exchange rates. Likewise, guest loading in DMF is low because linker exchange is slower in DMF compared to n-butanol (FIG. 11). As expected for diffusion-controlled guest incorporation, R6G loading was found to be directly proportional to the initial concentration of R6G.

Figure 1:
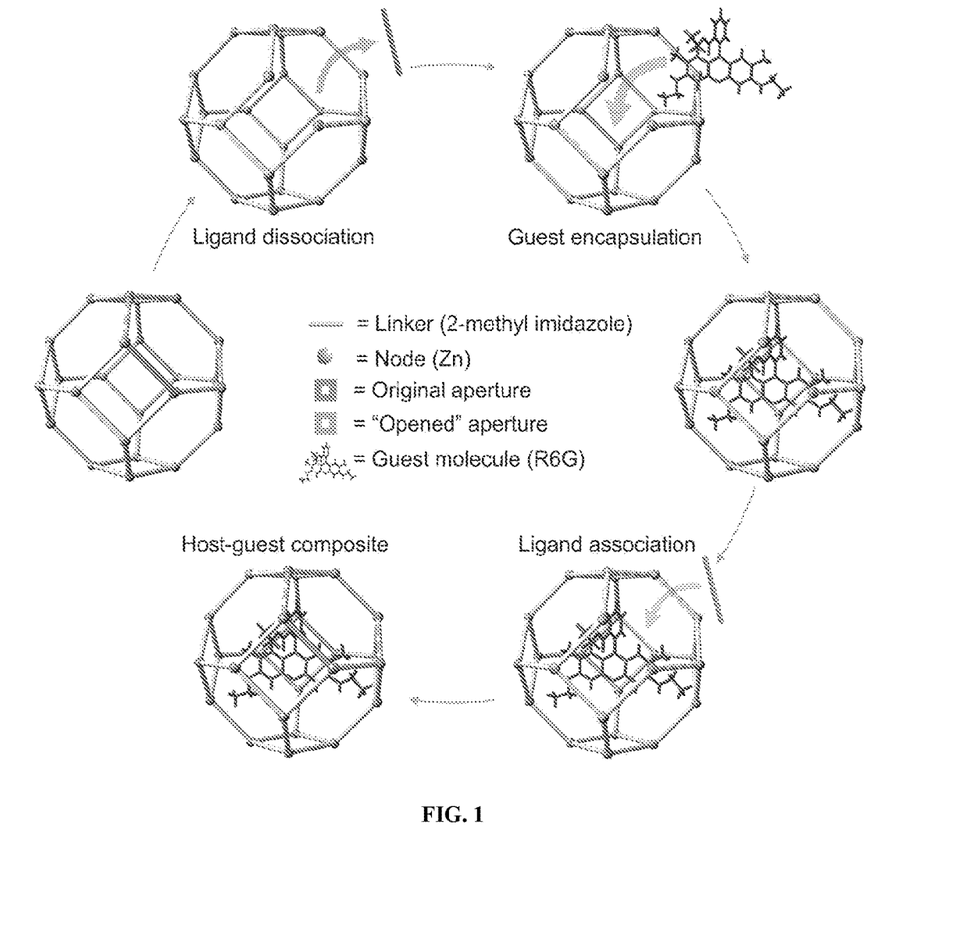
FIG. 1 schematically illustrates the concept of encapsulating a guest molecule having a diameter larger than the aperture size of a MOF.

Example 11: Effect of Exogenous 2-Methylimidazole Linker Concentration on Guest Loading In order to gain a better understanding of the guest encapsulation process, the effect that the exogenous 2-methylimidazole linker concentration had on guest loading was explored. Somewhat surprisingly, R6G loading was inversely proportional to the concentration of 2-methylimidazole linker (FIG. 6B). In fact, the highest loading of R6G was observed when reactions were carried out without any exogenous 2-methylimidazole linker. This result could be rationalized by a dissociative linker substitution mechanism where dissociation of 2-methylimidazole from ZIF-8 led to the formation of a linker-deficient "open" state (FIG. 1). Under low concentrations of free imidazole, the "open" state is not as readily arrested by free linker, which provides more time for the guest to diffuse into the pores of the MOF. Consequently, higher guest loadings are observed at lower concentrations of the exchanging linker.

Example 12: Kinetics of Linker Exchange Reaction

Figure 5:
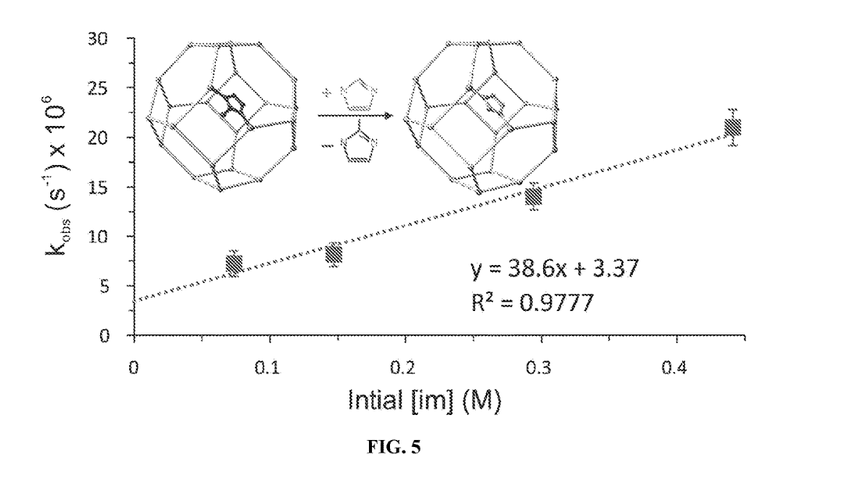
FIG. 5 illustrates the observed rate constants ($k_{obs}$) for exchange of ZIF-8 with imidazole at different concentrations of imidazole.

There are two basic steps in ligand substitution: association and dissociation. Association, in this case, refers to the binding of a ligand to the metal. The ligand donates an electron pair to the metal and the two molecules come together to form a new bond. Dissociation, in this case, refers to the release of a ligand from a metal. The metal-ligand bond breaks and the ligand leaves with its electron pair. Associative mechanism is association first, in which the new ligand binds and then the old one leaves and dissociative mechanism is dissociation first, in which the old ligand leaves and then the new one binds. To test the hypothesis that linker substitution is dissociative, the kinetics of the linker exchange reaction was examined under pseudo-first order conditions by varying the initial concentration of exogenous imidazole linker. Observed rate constants (kobs) for the linker exchange reaction could be obtained by using the method of initial rates (<10% conversion). The crystal structure of ZIF-8 was not perturbed under these conditions. By plotting kobs versus [imidazole], a linear correlation was observed with a non-zero slope and intercept (FIG. 5). These data suggest that there is a competition between associative and dissociative linker substitution reactions with the slope of this line (m=$38.6 \times 10^{-6}$ $M^{-1} \cdot s^{-1}$) being the second order rate constant for associative exchange, and the intercept (b=$3.37 \times 10^{-6}$ $s^{-1}$) being the first order rate constant for dissociative exchange. Under the empirically determined conditions employed for linker exchange ([imidazole]=147 mM), the apparent rate constant for associative linker substitution (kapp($s^{-1}$)=ka. [imidazole]) is $5.67 \times 10^{-6}$ $s^{-1}$, which is on par with the first order rate constant for dissociative linker exchange. Importantly, under the conditions that worked best to maximize guest incorporation ([imidazole]=0), the associative exchange mechanism was completely shut down. Indeed, the lower guest incorporation that is observed at higher linker concentrations may be due to a competing associative exchange process that precludes the formation of an "open" state for guest incorporation.

Example 13: Encapsulation of a Ligand Suitable for Incorporating Transition Metal Complexes in ZIF-8

Figure 12:
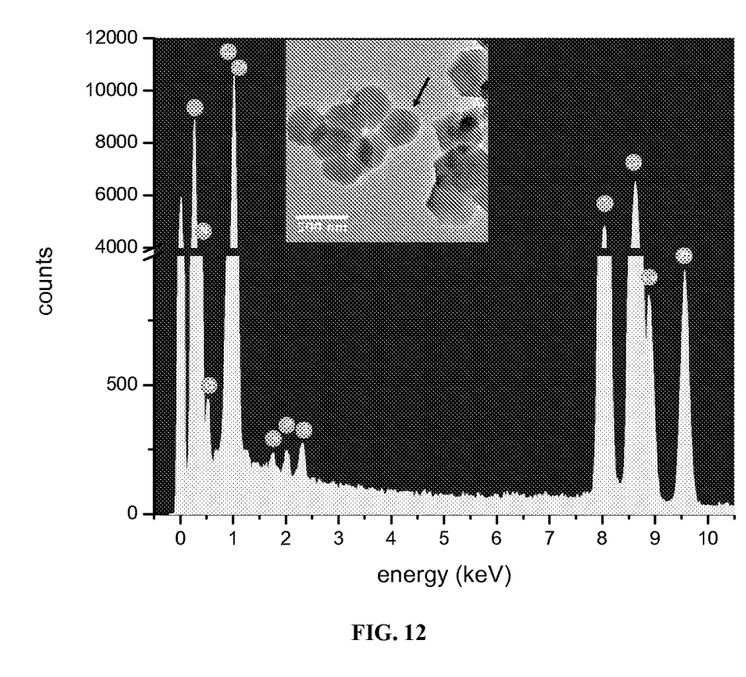
FIG. 12 is a representative energy dispersive X-ray spectrum of PPh$_3$@ZIF-8 loaded with initial PPh$_3$ at 220 mM. Inset is a TEM image of the area used for analysis, with the focused particle indicated by an arrow. The 10% pore loading of PPh$_3$ was estimated by multiplying the P/Zn atomic ratio of 0.016 by 6 (the number of unique Zn atoms per sodalite cage of ZIF-8).

Triphenylphosphine ($PPh_3$) (molecular diameter=9.56 Å) was chosen as the initial guest ligand since it is one of the most common ligand in catalysts. The same method used for dye encapsulation was adopted to encapsulate $PPh_3$ in ZIF-8 (henceforth referred to as $PPh_3$@ZIF-8) using initial [$PPh_3$] of 165 mM and 220 mM. Elemental analysis of the product obtained with an initial [$PPh_3$] of 220 mM indicated a $PPh_3$ loading of 2 wt. % (FIG. 12).

Figure 13:
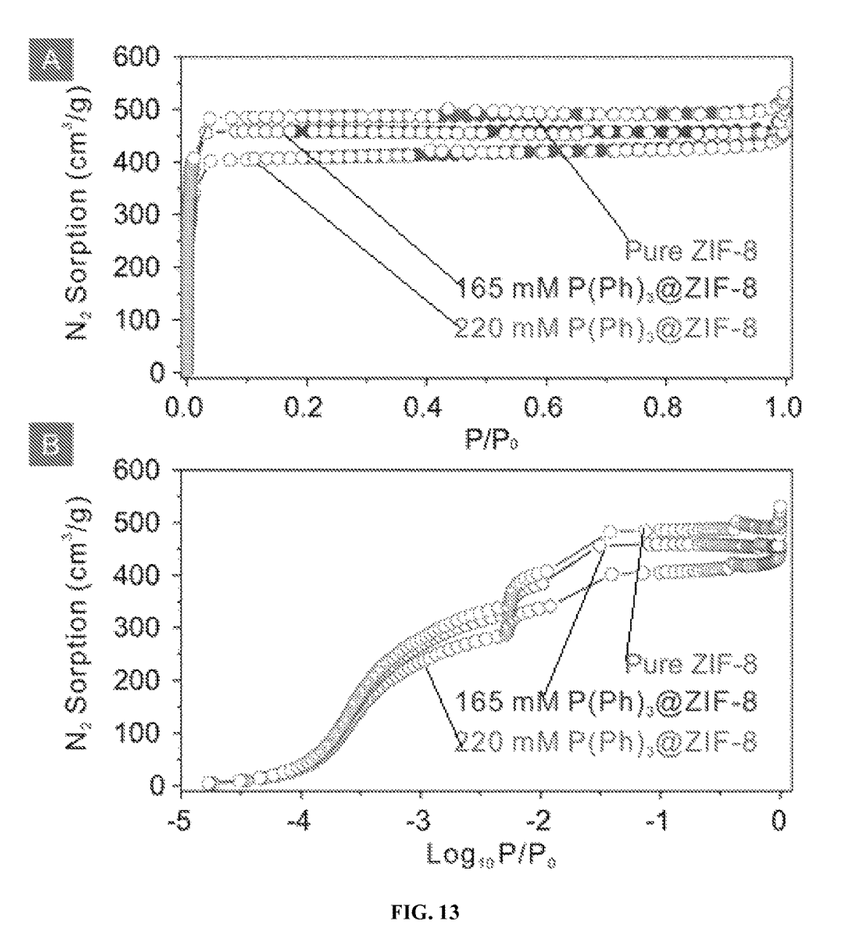
FIG. 13 illustrates the N$_2$ absorption (filled symbols) and desorption (open symbols) isotherms of ZIF-8, 165 mM triphenylphosphine@ZIF-8, and 220 mM triphenylphosphine@ZIF-8. Panel A illustrates the N$_2$ absorption and desorption in a scale of $P/P_0$. Panel B illustrates the N$_2$ absorption and desorption in a scale of $Log_{10}P/P_0$ under low pressure.

To demonstrate that the $PPh_3$ was mainly encapsulated within the pores of ZIF-8 and not on its surface, $N_2$ adsorption data were collected at 77 K on the two loadings of $PPh_3$@ZIF-8 and the commercial source of ZIF-8 with a high resolution of points in the micropore adsorption region (FIG. 13). Saturation of the micropore volume with $N_2$ occurred for the reference ZIF-8 material at 485 $cm^3$/g, and the BET surface area was calculated to be 1554 $m^2$/g using a P/Po range of $5 \times 10^{-4}$ to $5 \times 10^{-3}$ (before gating) or 1885 $m^2$/g with a range of $5 \times 10^{-4}$ to $10^{-2}$ (after gating). These surface areas are in agreement with ZIF-8 values from the literature. For the $PPh_3$@ZIF-8 samples, micropore saturation occurred at 459 $cm^3$/g for the sample exchanged with 165 mM $PPh_3$ and at 405 $cm^3$/g for that with 220 mM $PPh_3$, which is 5% and 16% lower compared to ZIF-8. This decrease in the micropore adsorption capacity was in excess of the decrease anticipated from the weight gain upon loading (only 2%) and was consistent with guests occupying some pores of the MOF. From these data, it was estimated that approximately one in every 10 pores in ZIF-8 was occupied by a triphenylphosphine ligand. Such loadings are only possible by the linker exchange process that facilitates incorporation of the large ligand guest.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A host-guest complex comprising a metal-organic framework (MOF) as a host and a molecule as a guest, wherein the guest is encapsulated within the host; wherein the guest has a diameter larger than the aperture size of the host; wherein the MOF is (ZIF-8), and wherein the molecule is M-$PPh_3$.

2. A method of making a host-guest complex comprising a metal organic framework (MOF) as a host and a molecule as a guest, wherein the guest is encapsulated within the host, wherein the guest has a diameter larger than the aperture size of the host; and wherein the MOF is a zeolite imidazolate framework (ZIF), the method comprising: heating a mixture comprising a MOF, a molecule, and a solvent, whereby the guest molecule is encapsulated within the host, and has a diameter larger than the aperture size of the MOF, and wherein the mixture further comprises an exogenous linker, wherein the exogenous linker is does not disrupt the MOF crystal structure and morphology and is an analog of the organic linker contained in the MOF.

3. The method of claim 2, wherein the metal ion is selected from the group consisting of Zn, Cu, Ni, Co, Fe, Mn, Cr, Cd, Mg, Ca, Zr, Gd, Eu, Tb, In, Al and mixtures thereof.

4. The method of claim 2, wherein the metal ion is selected from the group consisting of Zn, Cu, Fe, Gd, Mg, Al, Ni, Co, In and mixtures thereof.

5. The method of claim 2, wherein the metal ion is at least selected from the group consisting of Zn, Cu, Fe, Al, Ni, Co, In and any mixtures thereof.

6. The method of claim 2, wherein the MOF is selected from the group consisting of ZIF-1 to ZIF-12.

7. The method of claim 2, wherein the MOF is ZIF-8.

8. The method of claim 2, wherein the molecule has a diameter less than the pore size of the MOF.

9. The method of claim 2, wherein the molecule is selected from a biological agent, a drug, a dye, a nanoparticle, a catalyst, and mixtures thereof.

10. A method of making a host-guest complex comprising a metal organic framework (MOF) as a host and a molecule as a guest, wherein the guest is encapsulated within the host; wherein the guest has a diameter larger than the aperture size of the host; and wherein the MOF is a zeolite imidazolate framework (ZIF), the method comprising: heating a mixture comprising a MOF, a molecule, and a solvent; whereby the guest molecule is encapsulated within the host, and has a diameter larger than the aperture size of the MOF, and wherein the molecule is M-$PPh_3$.

11. The method of claim 2, wherein the mixture is heated at a temperature ranging between about 0° C. and about 200° C.

12. The method of claim 2, wherein the mixture is heated at a temperature of about 100° C.

13. The method of claim 2, wherein the mixture is heated for a period of time ranging from about 1 hour to about 10 days.

14. The method of claim 2, wherein the mixture is heated for a period of time of about 7 days.

15. The method of claim 2, wherein the solvent is selected from the group consisting of $C_{1-6}$-alkyl alcohol, dimethyl sulfoxide (DMSO), N,N-dimethylformamide (DMF), N,N-diethylformamide (DEF), N,N-dimethylacetamide (DMAc), acetonitrile, toluene, dioxane, benzene, chlorobenzene, methyl ethyl ketone (MEK), pyridine, tetrahydrofuran (THF), ethyl acetate, glycol, N-methylpyrrolidone (NMP), gammabutyrolactone, alicyclic alcohols such as cyclohexanol, ketones such as acetone or acetylacetone, cycloketones such as cyclohexanone, sulfolene and mixtures thereof.

16. The method of claim 2, wherein the solvent is selected from the group consisting of n-butanol, DMF, acetonitrile, and mixtures thereof.

17. The host-guest complex of claim 1, wherein the guest s encapsulated within the host via an aperture opening process.

18. The host-guest complex of claim 1, wherein the guest is not tethered or covalently bound to the MOF.

19. The host-guest complex of claim 1, wherein an electrostatic interaction between the guest and the MOF host is not required.

* * * * *